(12) United States Patent
Kalenowski et al.

(10) Patent No.: US 12,275,607 B2
(45) Date of Patent: Apr. 15, 2025

(54) TABBED ROLL OF SHEET MATERIAL AND METHOD OF MAKING SAME

(71) Applicant: Pinnacle Converting Equipment & Services, LLC, Charlotte, NC (US)

(72) Inventors: Gregory Kalenowski, Charlotte, NC (US); Donald R. Eberly, Fort Mill, SC (US); Nicholas G. Perkins, Fort Mill, SC (US); Gene Allen Ray, Monroe, NC (US)

(73) Assignee: Pinnacle Converting Equipment & Services, LLC, Charlotte, NC (US)

( * ) Notice: Subject to any disclaimer, the term of this patent is extended or adjusted under 35 U.S.C. 154(b) by 300 days.

(21) Appl. No.: 17/838,438

(22) Filed: Jun. 13, 2022

(65) Prior Publication Data

US 2022/0402718 A1   Dec. 22, 2022

Related U.S. Application Data

(60) Provisional application No. 63/211,850, filed on Jun. 17, 2021.

(51) Int. Cl.
    *B65H 18/28*   (2006.01)
    *B29C 65/00*   (2006.01)
    (Continued)

(52) U.S. Cl.
    CPC .............. *B65H 18/28* (2013.01); *B29C 65/72* (2013.01); *B29C 66/431* (2013.01);
    (Continued)

(58) Field of Classification Search
    CPC ............ B65H 18/28; B65H 2701/1842; B65H 2701/1924; B65H 2301/414425;
    (Continued)

(56) References Cited

U.S. PATENT DOCUMENTS 3,134,980 A * 5/1964 Alexander ................ B31F 5/02
                                                    156/308.6
3,592,340 A * 7/1971 Hoey .................... B65D 85/671
                                                    156/220

(Continued)

FOREIGN PATENT DOCUMENTS

WO   WO-2015087215 A1 * 6/2015 ........ A61F 13/51121

*Primary Examiner* — Cynthia L Schaller
(74) *Attorney, Agent, or Firm* — Jeffrey C. Watson, Esq.; Grell & Watson Patent Attorneys LLC

(57) ABSTRACT

A method and/or a machine is for tabbing a free end on a roll of sheet material. Converting a master roll of sheet material to the roll of sheet material and winding a first roll of sheet material onto a spindle at a winding position. Tabbing the free end of the roll of sheet material at a tabbing position. Where a tabber carrying a joiner are both in an initial position away from the first roll of sheet material, moving the tabber to a second position adjacent the roll of sheet material, moving the joiner into an engagement position where the joiner is engaged with the free end of the roll of sheet material. The joiner creates a tab with a combination of mechanical entanglement and heat welding. Returning the tabber and joiner to the initial positions. Doffing the tabbed roll of sheet material. The roll produced by the foregoing.

20 Claims, 5 Drawing Sheets

(51) Int. Cl.
  *B29C 65/08*     (2006.01)
  *B29C 65/72*     (2006.01)
  *B31F 5/02*      (2006.01)
  *B29C 65/16*         (2006.01)

(52) U.S. Cl.
  CPC .......... *B29C 66/7294* (2013.01); *B31F 5/027* (2013.01); *B29C 65/08* (2013.01); *B29C 65/16* (2013.01); *B65H 2701/1842* (2013.01); *B65H 2701/1924* (2013.01)

(58) Field of Classification Search
  CPC ........ B65H 2301/414427; B65H 19/29; B29C 65/72; B29C 66/431; B29C 66/7294; B29C 65/08; B29C 65/16; B29C 65/7437; B29C 65/7441; B29C 65/7443; B29C 66/21; B29C 66/341; B29C 66/496; B29C 66/73921; B29C 66/81423; B29C 66/81429; B29C 65/18; B29C 66/71; B29C 66/727; B29C 66/929; B29C 66/949; B29C 65/7882; B29C 66/1122; B29C 66/30621; B29C 66/81463; B29C 66/8322; B29C 66/8432; B31F 5/027; B29K 2023/06; B29K 2023/12; B29K 2067/003; B29K 2077/00; B29K 2001/00; B29K 2033/08; B29K 2075/00; B29K 2027/06
  USPC .................................. 156/513, 253; 93/1.1
  See application file for complete search history.

(56) References Cited

U.S. PATENT DOCUMENTS

| | | | | |
|---|---|---|---|---|
| 3,898,920 | A | * | 8/1975 | Zucker .................. B65H 19/29 |
| | | | | 493/464 |
| 10,351,377 | B2 | | 7/2019 | Mathy, Jr. et al. |
| 2005/0058752 | A1 | * | 3/2005 | Deason .................. B65H 18/28 |
| | | | | 426/327 |
| 2008/0245693 | A1 | * | 10/2008 | Vinson .................. A47K 10/16 |
| | | | | 206/412 |
| 2017/0036875 | A1 | * | 2/2017 | Mathy, Jr. .......... B29C 66/7294 |

* cited by examiner

TABBED ROLL OF SHEET MATERIAL AND METHOD OF MAKING SAME

RELATED APPLICATION

This application claims the benefit of U.S. Provisional Patent Application No. 63/211,850, filed Jun. 17, 2021, incorporated herein by reference.

FIELD OF THE INVENTION

This application is related to a process and a machine for tabbing or staking a wound sheet on a roll, and the roll produced thereby.

BACKGROUND OF THE INVENTION

Rolls of sheet material (e.g., nonwoven sheets) have become a staple component of certain commodity products, such as, for example, disinfecting wipes. These wipes are commercially available, but since the COVID-19 pandemic, the demand for these wipes has increased. It is expected that, with the passing of the pandemic, demand for these wipes will remain above pre-pandemic levels.

These rolls of sheet material are converted from master rolls of the sheet material to smaller uniform rolls (e.g., narrower in cross machine direction than the master roll, lesser diameters than the master roll, and perforated to facilitate dispensing of individual sheets). The smaller rolls are stuffed into cans (e.g., plastic containers), the container is filled with a liquid (e.g., a disinfectant) which is absorbed into the sheet material), the container is sealed (e.g., with a removeable plastic film), and capped with a cap that facilitates dispensing of the wipe (e.g., the wipe is pulled through the cap from the center of the roll) and re-sealing of the container (e.g., to slow the loss of the liquid).

In the manufacture of the roll of sheet material, one end of the sheet material is held by a winding spindle, but the other end, on the outside of the roll, is free after winding. This free end must be secured for subsequent transport during manufacture (e.g., after doffing and before stuffing into the container). If not secured (or well secured), the free end can unravel and cause manufacturing issues, see, for example, U.S. Ser. No. 10/351,377, incorporated herein by reference, that describes an ultrasonic tabbing. Prior attempts to 'tab' (or 'stake') the free end (i.e., secure the free end to the roll, thereby inhibiting unraveling) have been unsatisfactory.

Hereinafter, a method of tabbing the free end and the tabbed roll of sheet material is disclosed.

SUMMARY OF THE INVENTION

A method and/or a machine is for tabbing a free end on a roll of sheet material. Converting a master roll of sheet material to the roll of sheet material and winding the roll of sheet material onto a spindle at a winding position. Tabbing the free end of the roll of sheet material at a tabbing position. Where a tabber carrying a joiner are both in an initial position away from the roll of sheet material, moving the tabber to a second position adjacent the roll of sheet material, moving the joiner into an engagement position where the joiner is engaged with the free end of the roll of sheet material. The joiner creates a tab with a combination of mechanical entanglement and heat welding. Returning the tabber and joiner to the initial positions. Doffing the tabbed roll of sheet material. The roll produced by the foregoing.

DESCRIPTION OF THE DRAWINGS

For the purpose of illustrating the invention, there is shown in the drawings a form that is presently preferred; it being understood, however, that this invention is not limited to the precise arrangements and instrumentalities shown.

DESCRIPTION OF THE INVENTION

In general, the process starts with a master roll of the sheet material, not shown. As the master roll is unwound, the sheet material is slit in the machine direction (to reduce the width of or narrow the roll) and perforated in the cross machine direction (to facilitate dispensing of subdivided portions of the sheet material from the can for use), and cut in the cross machine direction (to shorten the length of the sheet material from the master roll). These operations are conventional.

Figure 1:
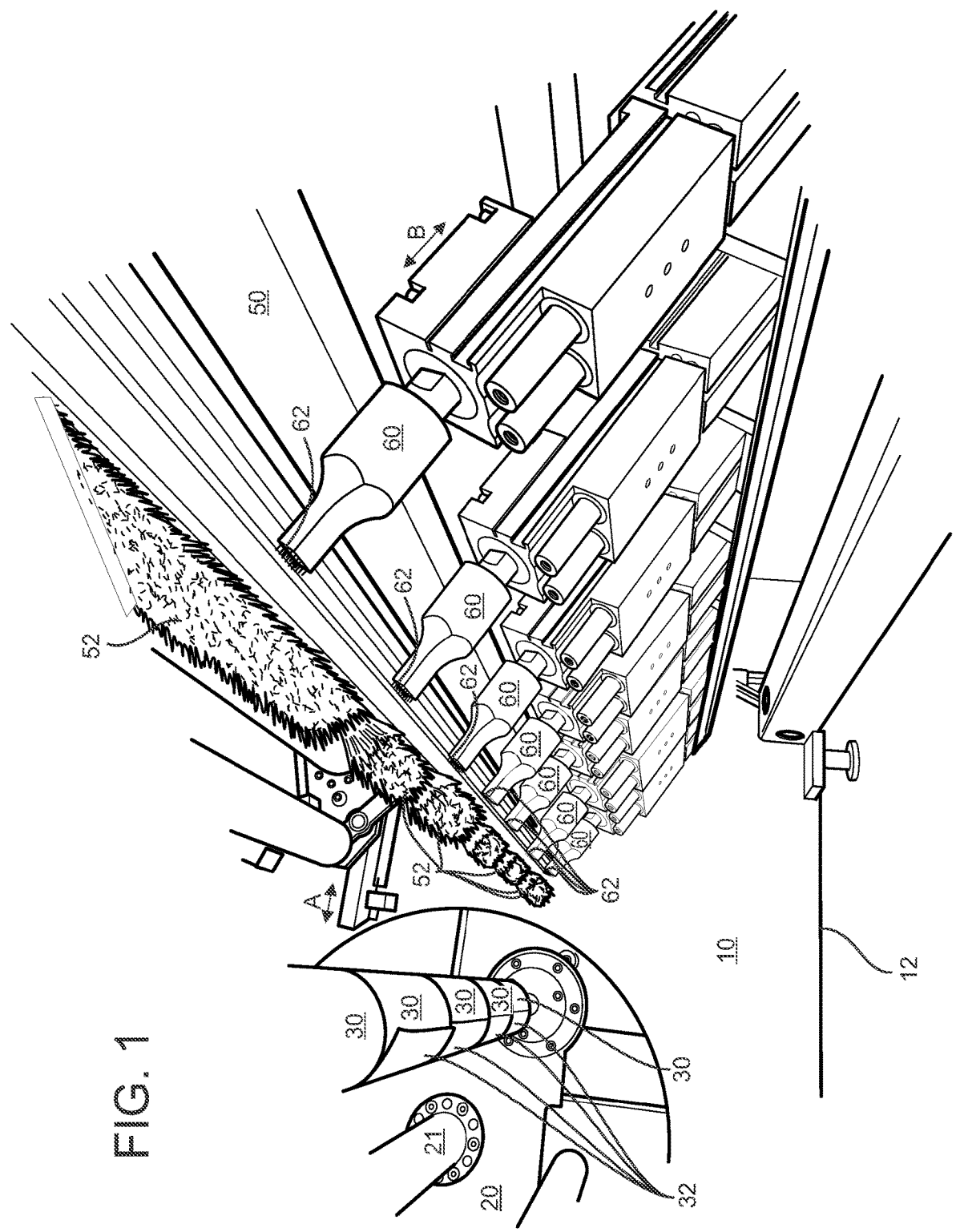
FIG. 1 is an illustration of an embodiment of the invention showing the tabber, located away from the rolls, and the rolls to be tabbed.

FIG. 1 shows a portion of a machine 10 (for performing the inventive process) with a turret 20 and a tabber 50 for carrying the joiner 60. The translating tabber 50 is located away from rolls 30 and may carry several reciprocating joiners 60. Tabber 50 translates in the directions indicated by arrow A (which may be generally parallel to a base 12 of machine 10). Joiners 50 reciprocate in directions indicated by arrow B (which may be generally radial to the roll 30). Further discussion of these components is set out below.

Figure 2:
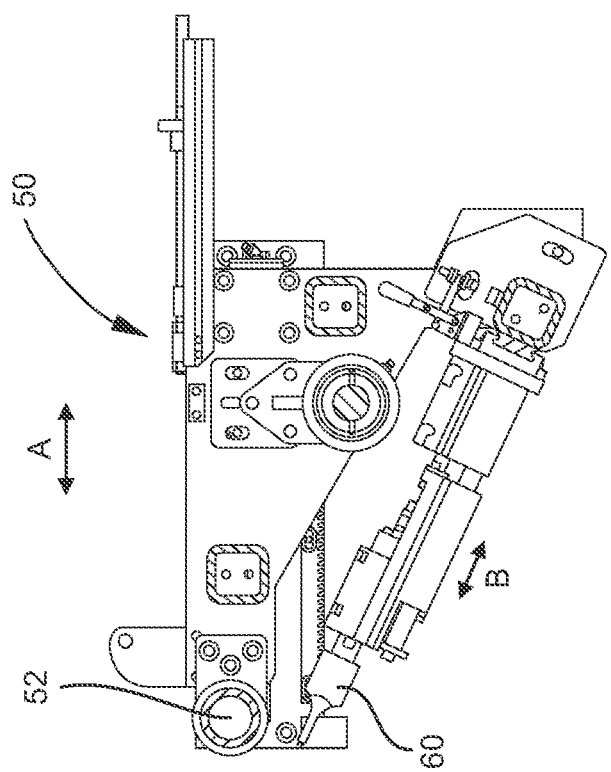
FIG. 2 is a schematic illustration of an embodiment of the invention with the tabber located away from the rolls to be tabbed.
Figure 2:
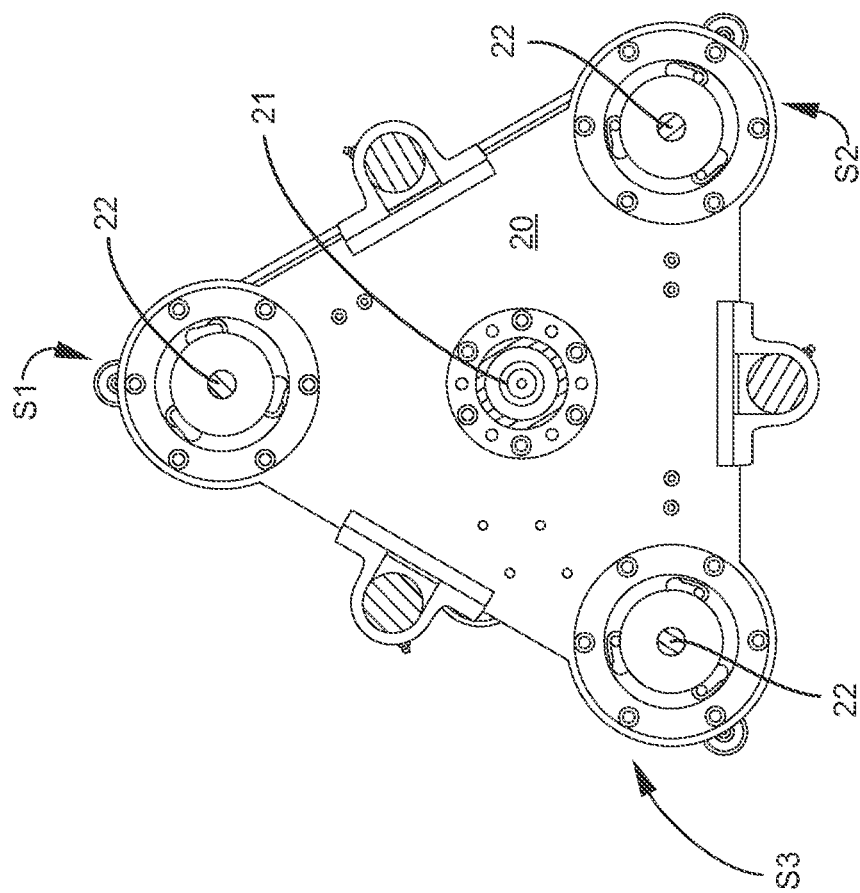
Figure 3:
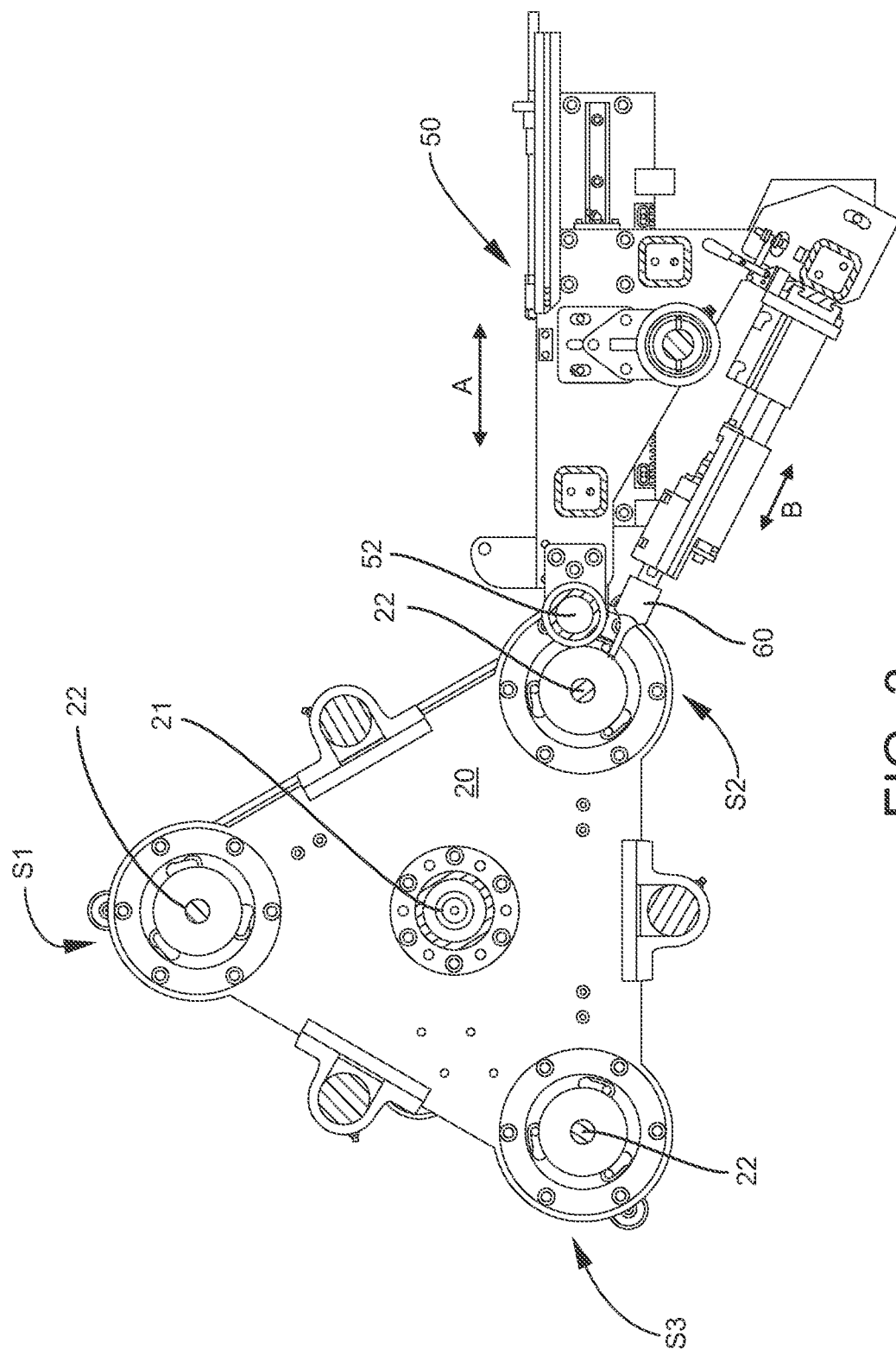
FIG. 3 is a schematic illustration of an embodiment of the invention with the tabber located for engagement with the rolls to be tabbed.

Referring to FIGS. 2 and 3, the operation of the process/machine will be discussed in greater detail. In FIGS. 2 and 3, on the left side, is a 3-stage rotatable turret 20, with spindles 22 at each corner (or stage), that rotate on (or about) axis 21. In this embodiment, the stage one S1 is the re-wind stage that receives the converted sheet material. After the spindle at S1 has received the desired amount of sheet material, re-winding is stopped. Then, the 3-stage turret is indexed (rotated about axis 21) and the wound roll 30 is moved to the tabbing stage S2.

At tabbing stage S2, the tabber 50 that carries the joiner(s) 60 is located away from the roll 30. The tabber 50 moves adjacent the roll so that a laydown roll (and/or brush) 52 engages the roll 30 (to flatten the free end 32 of the roll and thereby facilitate joining), and the joiner 60 is moved into engagement with the free end 32, so that free end 32 is pressed into the body of the roll 30. The joiner 60 engages the free end of the roll in a generally radial direction in relation to the roll of sheet material (or generally perpendicular to the tangent of the roll of sheet material). During engagement, the joiner 60 forms the tab 34 (best seen in FIG.

5) by mechanical entanglement and heat welding, discussed in greater detail below, and does not oscillate against the roll (as described in U.S. Ser. No. 10/351,377, incorporated herein by reference). The tab 34 secures the free end 32 to roll 30, thereby minimizing or eliminating unraveling. Thereafter, the tabber 50 and joiner 60 are retracted away from the tabbed roll 30. And the turret 20 is indexed to the doffing stage S3.

At doffing stage S3, tabbed roll(s) 30 are removed from the spindle 21 (e.g., pushed off the spindle, for example, into a chute or a conveyor (not shown) for subsequent transport to a stuffer (not shown)).

While a 3-stage turret is illustrated, the invention is not so limited and additional stages may be added.

While only a single joiner 60 is illustrated in FIGS. 2 and 3 more than one joiner is contemplated, see, for example, FIG. 1.

Figure 4A:
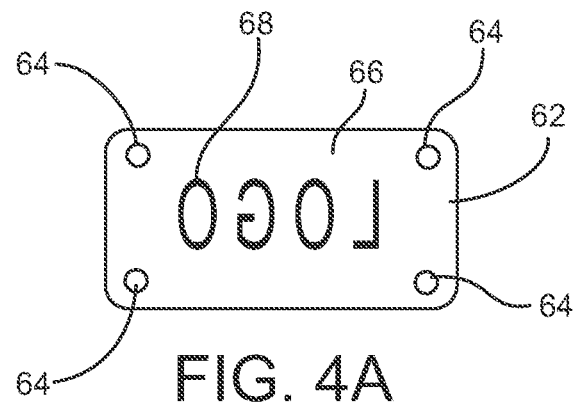
FIG. 4A is a top plan view of an embodiment of a head of the joiner.
Figure 4B:
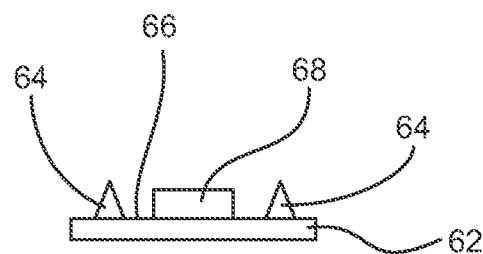
FIG. 4B is an elevational view of the embodiment shown in FIG. 4A.
Figure 4C:
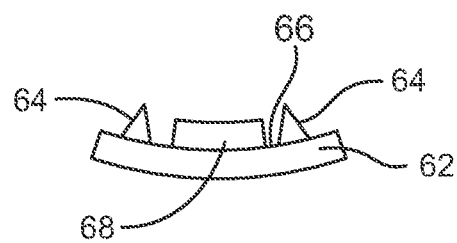
FIG. 4C is an elevational view of a head with a curved surface.

FIGS. 4A, 4B, and 4C illustrate an embodiment of the head 62 of joiner 60. The joiner 60 is capable of forming a tab 34 with a combination of mechanical entanglement and heat welds. Head 62 has pins 64 and weld surface 66. Pins 64 are adapted to penetrate at least two sheets of the rolled sheet material (discussed in greater detail below). Weld surface 66 is adapted to convey heat to melt a portion of the sheet material (discussed in greater detail below).

The pin 64 may be cylindrical or conical or truncated conical. The pins may number from about 2-50 per head including subsets thereof. The pins may have a base diameter in the range of about 1/16-1/8 inch (1-3 mm) including subsets thereof. A pin may have a height in the range of about 1/16-1/2 inch (1-13 mm) including subsets thereof. Pins may have a penetration depth into the material in a range of about 0.005-0.500 inches (0.1-13 mm) including subsets thereof. The pins may have barbs (to facilitate mechanical entanglement). FIG. 4B illustrates a head with a flat surface 66, while FIG. 4C illustrates a head with a curved (concave) surface 66. The curved surface 66 generally may have the same arc as the roll 30.

The joiner 60 may uses an ultrasonic generator, a thermal generator, and/or a laser powered joiner. In the welding operation, three parameters may be controlled: 1) the power of the welder, 2) the pressure (plunge force) of the welder into the free end and the body of the roll; and 3) time of engagement for welding. In one embodiment, the ultrasonic joiner (welder) may be controlled to about: 1) power—up to 100 watts (at 35 kHz); 2) pressure (plunge force)—up to 90 psi; 3) engagement time—up to 3 seconds. In other embodiments, these paraments may be about: 1) power—10-50 watts; 2) pressure 20-60 psi; and 3) time—0.1-2 seconds.

Figure 5:
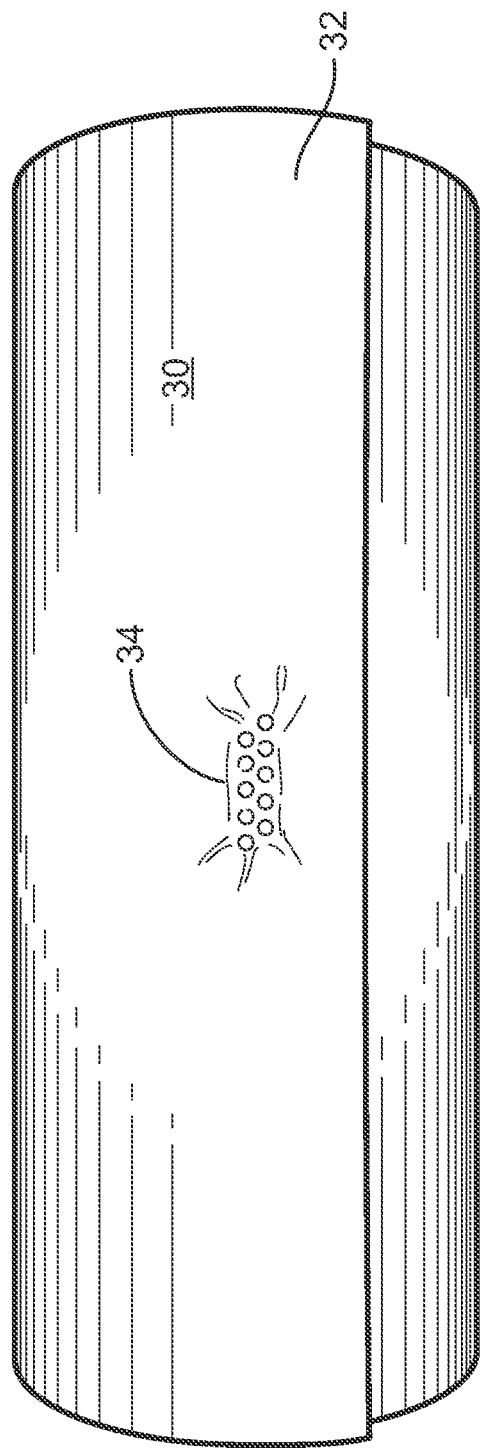
FIG. 5 is an illustration of an embodiment of a tabbed roll according to the invention.

FIG. 5 illustrates a tabbed 30 roll of sheet material. The roll 30 has been converted from a master roll of sheet material, is ready for 'stuffing' into a can, and has been 'tabbed' (or 'staked'). The tab (or stake) 34 may be located away from the lateral ends of the roll 30 and is generally located in a mid-section of the roll, e.g., within the middle third of the roll. While only one tab is shown, more than one tab may be used, e.g., a tab in each third of the roll. The tab is formed by mechanical entanglement and heat welding. Mechanical entanglement is obtained by pins that penetrate at least two layers of the sheet material in the roll. As the pins penetrate the layers, material (e.g., fibers) from the outermost layers entangles with the material (e.g., fibers) of the inner layers, thereby forming a mechanical entanglement of material. Heat welding is obtained by melting some of the material of the outmost layer to material of inner layers. Heat may be generated by an ultrasonic generator, a thermal generator and/or a laser generator. Weld points 68 may also include lines (e.g., straight, wavy, continuous and/or discontinuous), geometric shapes (e.g., points, circles, squares, rectangles, triangles, and annular equivalents thereof) or designs (including, e.g., logos).

The sheet material may be a nonwoven sheet. The sheet material (e.g., nonwoven) may have a basis weight in the range of 20-100 grams per square meter (gsm). The nonwoven sheet may be made of any material, so long as the fibers of the nonwoven may be welded. Suitable fibers of the nonwoven may include, for example, polyolefins (e.g., polyethylene (PE) and polypropylene (PP)), polyesters (e.g., PET), polyamides (e.g., nylon), viscose, acetate, acrylic, polyurethane (e.g., PU), polyvinylchloride (e.g., PVC), other commodity fibers, and combinations thereof. Additionally, the nonwoven may include binders and bicomponent fibers. Alternatively, the sheet material may be a foam or film or have a foam or film layer or be a laminate of nonwoven layers and/or foam and/or film and combinations thereof. These alternate materials may be the same as the listed fiber materials. The sheet material may be perforated (i.e., other than perforations that facilitate tearing).

The foregoing tabbing operation may be used with any converting operation. In one embodiment, the tabbing operation is used in the manufacture of disinfectant wipes.

The present invention may be embodied in other forms without departing from the spirit and the essential attributes thereof, and, accordingly, reference should be made to the appended claims, rather than to the foregoing specification, as indicating the scope of the invention.

We claim:

1. A method for tabbing a free end on a roll of sheet material comprises the steps of:
    tabbing the free end of the roll of sheet material at a tabbing position, where a tabber carrying a joiner are both in initial positions away from the roll of sheet material, moving the tabber to a second position adjacent the roll of sheet material, moving the joiner into an engagement position where the joiner is engaged with the free end of the roll of sheet material, creating a tab with the joiner simultaneously mechanically entangling and heat welding the sheet material, and returning the tabber and joiner to the initial positions, and
    doffing the tabbed roll of sheet material, and
    repeating the foregoing steps.

2. The method of claim 1 wherein the joiner engages the roll of sheet material at a generally radial direction in relation to the roll of sheet material.

3. The method of claim 1 wherein the heat welding is created by an ultrasonic generator, a thermal generator, and/or laser generator.

4. The method of claim 1 wherein the mechanical entangling is created by a pin that penetrates at least two layers of the sheet material of the roll of sheet material.

5. The method of claim 4 wherein the joiner has at least two pins or 2-50 pins.

6. The method of claim 4 wherein the joiner includes at least two pins and a geometric pattern.

7. The method of claim 4 wherein the pin has a height in a range of 1/16 to 1/2 inch.

8. A roll of sheet material comprises: a roll of nonwoven sheet material with a free end, the roll of nonwoven sheet material is subdivided in the machine direction by several perforated lines oriented in the cross-machine direction, a tab joins the free end to the roll of nonwoven sheet material thereby inhibiting unraveling of the free end from the roll of sheet material, the tab is located between the lateral ends of the roll, the tab is a concentric or overlapping combination of mechanically entangled fibers and heat welded fibers.

9. The roll of claim 8 wherein the nonwoven sheet material includes one or more of the following; thermoplastic fibers, binders, and/or bicomponent fibers.

10. The roll of claim 8 wherein the nonwoven sheet material is a laminate of nonwoven sheet material and sheet of film or foam, or a laminate of several sheets of nonwoven and several sheets of film and/or foam.

11. The roll of claim 8 wherein the heat welding is created by an ultrasonic generator, a thermal generator, and/or laser generator.

12. The roll of claim 8 wherein the mechanical entanglement is created by a pin that penetrates at least two layers of the nonwoven sheet material of the roll of sheet material.

13. A method for tabbing a free end on a roll of sheet material comprises the steps of:
   converting a master roll of sheet material to the roll of sheet material and winding a first roll of sheet material onto a spindle at a winding position;
   tabbing the free end of the roll of sheet material at a tabbing position, where a tabber carrying a joiner are both in an initial position away from the first roll of sheet material, moving the tabber to a second position adjacent the roll of sheet material, moving the joiner into an engagement position where the joiner is engaged with the free end of the roll of sheet material, the joiner creates a tab by simultaneously mechanically entangling and heat welding the sheet material, and returning the tabber and joiner to the initial positions, and
   doffing the tabbed roll of sheet material by removing the roll of sheet material from the spindle, and
   repeating the foregoing steps.

14. The method of claim 13 wherein the joiner engages the roll of sheet material at a generally radial direction.

15. The method of claim 13 wherein the heat welding is created by an ultrasonic generator, a thermal generator, and/or laser generator.

16. The method of claim 13 wherein the mechanical entangling is created by a pin that penetrates at least two layers of the sheet material of the roll of sheet material.

17. The method of claim 16 wherein the joiner has at least two pins or 2-50 pins.

18. The method of claim 16 wherein the joiner includes at least two pins and a geometric pattern.

19. The method of claim 16 wherein the pin has a height in a range of $\frac{1}{16}$ to $\frac{1}{2}$ inch.

20. The method of claim 13 further comprising the steps of:
   converting a master roll of nonwoven sheet material including thermoplastic fibers to the roll of sheet material and winding the first roll of sheet material onto the spindle at the winding position;
   tabbing the free end of the roll of sheet material at the tabbing position, where the tabber carrying the joiner are both in the initial position away from the first roll of sheet material, moving the tabber to the second position adjacent the roll of sheet material, moving the joiner into the engagement position where the joiner is engaged with the free end of the roll of sheet material, the joiner creates the tab simultaneously mechanical entangling by a pin of the thermoplastic fibers and ultrasonic heat welding of thermoplastic fibers, and returning the tabber and joiner to the initial positions, and
   doffing the tabbed roll of sheet material by removing the roll of sheet material from the spindle, and
   repeating the foregoing steps.

* * * * *